Jan. 29, 1946.     J. JANDASEK     2,393,859
TORQUE CONVERTER
Filed July 28, 1941
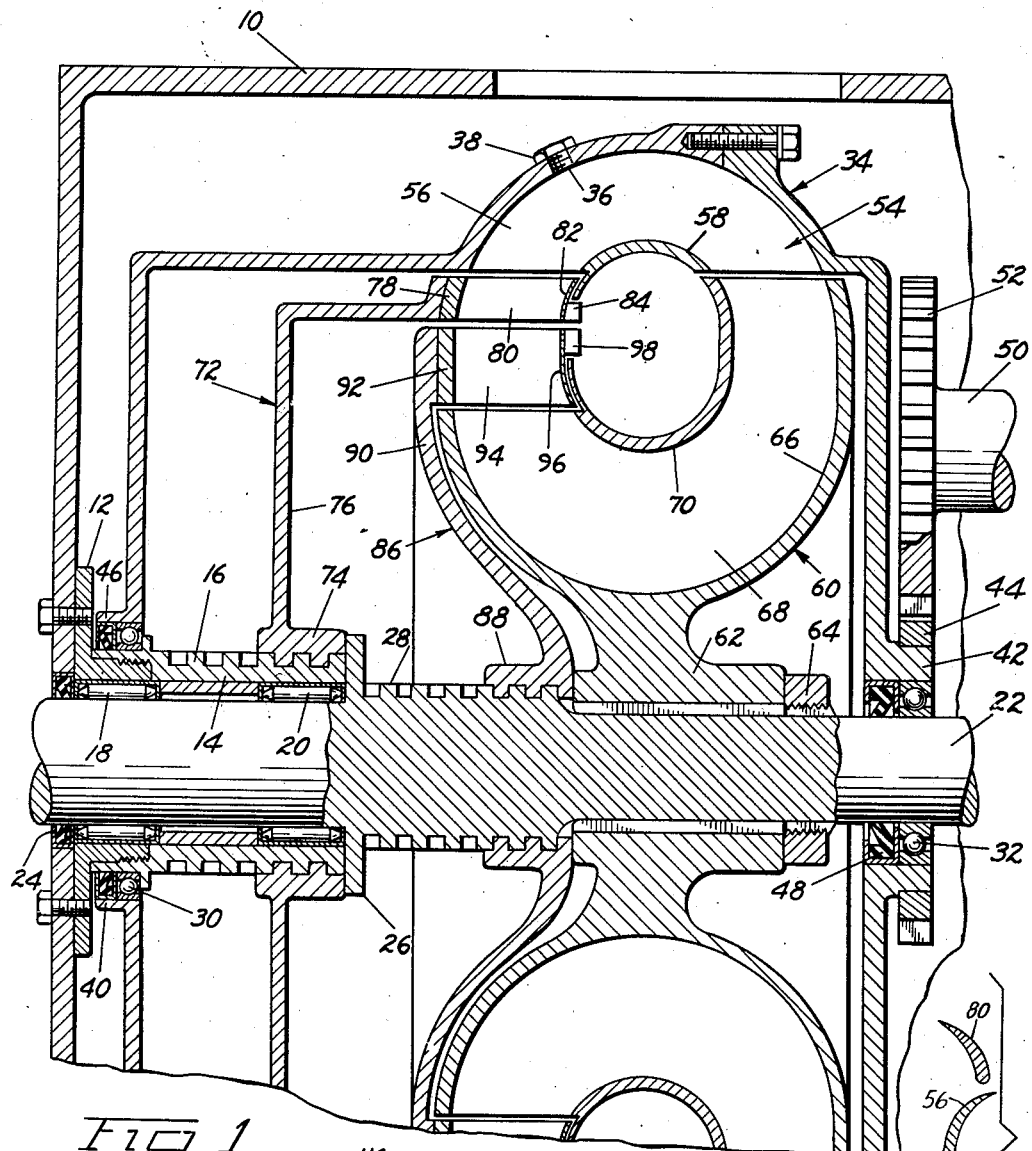
Fig 1
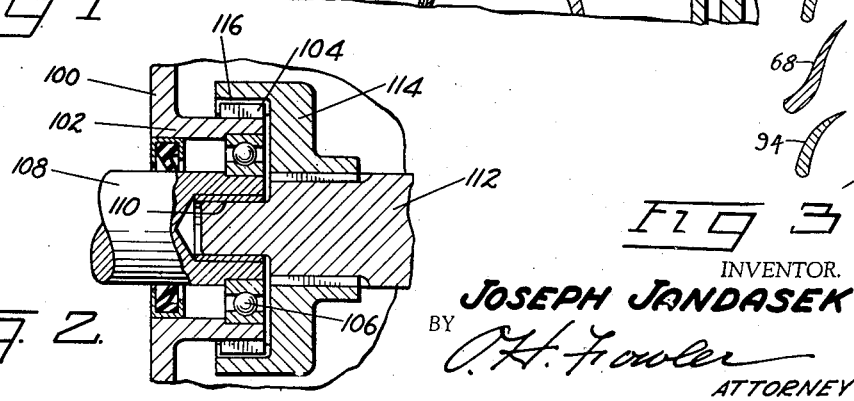
Fig 2.
Fig 3
INVENTOR.
JOSEPH JANDASEK
BY
ATTORNEY Patented Jan. 29, 1946

2,393,859

UNITED STATES PATENT OFFICE 2,393,859

TORQUE CONVERTER

Joseph Jandasek, Detroit, Mich., assignor to Bendix Aviation Corporation, Detroit, Mich., a corporation of Delaware Application July 28, 1941, Serial No. 404,418

4 Claims. (Cl. 60—54)

This invention relates to fluid drives, and more particularly to that type generally known in the art as fluid torque converters.

The invention comprehends a fluid torque converter including an impeller, a turbine opposed thereto and providing in conjunction therewith a fluid circuit, and a reaction member and an auxiliary impeller both automatically movable into and out of the fluid circuit.

An object of the invention is to provide a fluid torque converter having means operative to automatically increase the torque ratio when operating at low speeds and heavy loads.

Another object of the invention is to provide a fluid torque converter including means operative to automatically increase or decrease the torque ratio when required.

Another object of the invention is to provide a fluid torque converter including an impeller, a turbine opposed to the impeller, and means for increasing the blade area of the impeller when operating at low speeds and heavy loads.

Yet another object of the invention is to provide a fluid torque converter including an impeller, a turbine associated therewith, and means effective for automatically increasing and decreasing the diameter of the impeller during normal operation of the converter.

A further object of the invention is to provide a fluid torque converter including an impeller, a turbine associated therewith, and automatically operative means for increasing and decreasing the entrance diameter of the impeller.

Other objects and advantages of the invention will appear from the following description taken in connection with the drawing forming a part of this specification, and in which:

Fig. 1 is a vertical sectional view of a fluid torque converter embodying the invention; and Fig. 2 is a modification illustrating a desirable connection between the housing and driven shaft; and Fig. 3 is a diagrammatical illustration of vanes of the impeller, the turbine, the reaction member, and the auxiliary impeller.

Referring to the drawing for more specific details of the invention, 10 represents a stationary housing having a concentrically disposed hub 12 supporting an inwardly extended sleeve 14 provided with external threads 16.

Spaced needle bearings 18 and 20 fitted in the sleeve 14 support for rotation a driving shaft 22 adapted to be connected to an internal combustion engine, or other desirable type of power plant, and a fluid seal 24 fitted in the hub 12 embraces the shaft. As shown, the shaft has a circumferential flange 26 abutting the free end of the sleeve 14 and a threaded portion 28 adjacent the flange.

Bearings 30 and 32 fitted on the sleeve 14 and the driving shaft 22 support for rotation a housing 34. This housing is preferably made in two parts, bolted or otherwise secured together, and arranged in the wall of the housing is a filling opening 36 normally closed as by a plug 38. The housing has concentrically disposed hubs 40 and 42, and the hub 42 has thereon a gear 44. The hub 40 is supported on the bearing 30, and the hub 42 is supported on the bearing 32, and fluid seals 46 and 48 fitted in the hubs 40 and 42 inhibit seepage of fluid from the housing, and a driven shaft 50 has thereon a gear 52 in mesh with the gear 44.

A turbine, indicated generally at 54, includes a plurality of vanes 56 secured to the inner wall of the housing 34, and supporting an inner shroud 58. An impeller, indicated generally at 60, is mounted on the driving shaft 22 within the rotatable housing 34. The impeller includes a hub 62 splined to the driving shaft 22 and held in place by a retaining nut 64 threaded on the shaft. The hub 62 supports an outer shroud 66 providing in conjunction with the housing 34 a vortex chamber for circulation of fluid, and arranged on the outer shroud 66 is a plurality of blades 68 supporting an inner shroud 70. The intake end of the impeller is spaced from the outlet of the turbine, and the discharge end of the impeller is relatively close to the intake of the turbine.

A reaction member indicated generally at 72 is adapted to automatically move into and out of the fluid circuit. This reaction member includes a carrier 74 mounted for travel on the threads 16 of the fixed sleeve 14. The carrier has thereon a web 76 supporting an outer shroud 78 having arranged thereon a plurality of reaction vanes 80 supporting an inner shroud 82, and arranged on this shroud is a plurality of tabs 84. The reaction vanes 80 are movable into and out of the fluid circuit adjacent the outlet of the turbine.

An auxiliary impeller indicated generally at 86 is adapted to move automatically into and out of the fluid circuit between the reaction member and the intake of the impeller. The auxiliary impeller 86 includes a carrier 88 mounted for travel on the threaded portion 28 of the driving shaft 22. The carrier has a web 90, and secured to this web is an outer shroud 92 having thereon a plurality of auxiliary impeller blades 94 supporting an inner shroud 96 having arranged thereon a plurality of tabs 98.

A modification of the connection between the housing and driven shaft is illustrated in Fig. 2. In this modification a housing 100 has a hub 102, and secured to this hub is a gear 104. A bearing 106 fitted in the hub supports for rotation a driving shaft 108 having a concentrically disposed recess supporting a bearing 110, and a driven shaft 112 journaled on the bearing 110 has suitably secured thereto a flange 114 carrying a ring gear 116 in mesh with the gear 104.

In a normal operation, assuming that the vortex chamber is filled with fluid to its normal capacity, upon rotation of the driving shaft 22, the impeller 60 is actuated, and this actuation of the impeller energizes the fluid in the vortex chamber. The energy of the fluid is absorbed by the turbine 54, resulting in rotation thereof, and the consequent rotation of the housing 34. Upon rotation of the housing, force is transmitted through the gear 44 on the hub 42 of the housing to the gear 52 on the driven shaft 50, and this results in rotation of the driven shaft.

As the speed of rotation of the turbine 34 increases and the load thereon decreases, the direction of the fluid flow in the vortex chamber changes, and the fluid impinges on the backs of the reaction vanes 80 causing these vanes to automatically move out of the fluid circuit.

Concomitantly with this operation, the fluid also impinges on the backs of the blades 94 of the auxiliary impeller 86, and this causes the blades 94 of the auxiliary impeller to also move out of the fluid circuit, and thereafter the unit functions as a fluid coupling.

When the speed of the turbine 54 decreases and the load thereon is heavy, the direction of the fluid flow in the vortex chamber again changes, and the fluid impinges on the tabs 84 supported on the inner shroud 82 affixed to the reaction vanes 80, and this causes the reaction vanes 80 to move into the fluid circuit to provide torque multiplication.

Concomitantly with this operation, the fluid also impinges on the tabs 98 on the inner shroud 96 affixed to the blades 94 of the auxiliary impeller, and this results in the blades 94 moving into the fluid circuit.

Because of a differential in the rate of travel of the reaction member 72 and the auxiliary impeller 86, due to a differential in the threads 16 on the sleeve 14 and the threads 28 on the shaft 22 and/or in the tabs 84 and 98 and the blades 80 and 94, the reaction member may move into and out of the fluid circuit at a slightly different rate from that of the auxiliary impeller.

The auxiliary impeller moves into the fluid channel at the entrance of the impeller, and effectively increases the diameter thereof, with the consequent result that torque multiplication is further increased. When the blades 94 of the auxiliary impeller are fully within the circuit, the auxiliary impeller rotates with the impeller as a unit. Under this condition, the blade area of the impeller is increased, and this increase of blade area results in increase of the impeller speed, hence increase in velocity of fluid flow, and, accordingly, a proportionate increase in torque ratio of the fluid drive. This completes the cycle.

The instant application is a continuation in part of my Patent No. 2,339,484, granted January 18, 1944, which patent is a continuation in part of my Patent No. 2,222,618, granted November 26, 1940 on application Ser. No. 588,163, filed January 22, 1932.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid drive comprising a fixed support, a driving shaft journaled therein, an impeller driven by the shaft, a turbine cooperating with the impeller and providing in conjunction therewith a fluid channel, an auxiliary impeller mounted for limited rotation and axial movement on the shaft adapted to automatically move into and out of the channel due to changes in the direction of the flow of the fluid in the channel and to rotate with the impeller when in the channel, and a reaction member mounted for rotation and limited axial movement on the support in telescopic relation to the auxiliary impeller and operative to move concomitantly with the auxiliary impeller.

2. A fluid drive comprising a fixed support including a threaded sleeve, a shaft mounted for rotation in the sleeve having a threaded portion, an impeller carried by the shaft, a turbine cooperating with the impeller and providing in conjunction therewith a fluid channel, an auxiliary impeller mounted for travel on the threaded portion of the shaft adapted to automatically move into and out of the channel to vary torque ratio as working conditions may require, and a reaction member mounted for travel on the threaded sleeve in telescoping relation to the auxiliary impeller and operative to move concomitantly therewith.

3. A fluid drive comprising a fixed support including a threaded sleeve, a shaft mounted for rotation in the sleeve having a flange abutting the sleeve and a threaded portion adjacent the flange, an impeller carried by the shaft, a turbine cooperating with the impeller and providing in conjunction therewith a fluid channel, an auxiliary impeller mounted for travel on the threaded portion of the shaft between the flange thereon and the impeller and adapted to automatically move into and out of the channel to vary torque ratio as working conditions may demand, and a reaction member mounted for travel on the threaded sleeve in telescopic relation to the auxiliary impeller and adapted to move into and out of the channel concomitantly with the auxiliary impeller to further vary the torque ratio.

4. A fluid drive comprising an impeller and a turbine driven thereby providing in conjunction with one another a fluid channel, a shiftable auxiliary impeller and a shiftable reaction member both adapted to move into and out of the channel to vary torque ratio when the direction of fluid flow in the channel changes, the reaction member movable into and out of the channel at a different rate of travel than that of the auxiliary impeller.

JOSEPH JANDASEK.